US010091611B2

(12) United States Patent
Hansson et al.

(10) Patent No.: US 10,091,611 B2
(45) Date of Patent: Oct. 2, 2018

(54) METHOD, STATIONARY DEVICE, AND SYSTEM FOR DETERMINING A POSITION

(71) Applicant: AXIS AB, Lund (SE)

(72) Inventors: Niklas Hansson, Horby (SE); Arvid Nihlgard Lindell, Lund (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 15/371,887

(22) Filed: Dec. 7, 2016

(65) Prior Publication Data
US 2017/0171702 A1 Jun. 15, 2017

(30) Foreign Application Priority Data

Dec. 15, 2015 (EP) .................................... 15200157

(51) Int. Cl.
| H04W 24/00 | (2009.01) |
| H04W 4/02 | (2018.01) |
| H04W 4/04 | (2009.01) |
| H04W 4/20 | (2018.01) |
| H04W 64/00 | (2009.01) |
| H04W 4/80 | (2018.01) |
| H04W 88/06 | (2009.01) |

(52) U.S. Cl.
CPC ............ H04W 4/02 (2013.01); H04W 4/023 (2013.01); H04W 4/043 (2013.01); H04W 4/20 (2013.01); H04W 64/00 (2013.01); H04W 4/80 (2018.02); *H04W 88/06* (2013.01)

(58) Field of Classification Search
USPC .......... 455/414.1–414.2, 418–420, 423–425, 455/456.1–456.3, 457, 566–569.2
See application file for complete search history.

(56) References Cited

U.S. PATENT DOCUMENTS

| 8,055,296 | B1 * | 11/2011 | Persson | ................ G02B 27/017 |
| | | | | 455/456.1 |
| 8,472,632 | B2 | 6/2013 | Riedel et al. | |
| 8,682,354 | B2 * | 3/2014 | Zhong | ................... G01S 5/0036 |
| | | | | 370/252 |
| 2005/0177256 | A1 | 8/2005 | Shintani et al. | |

(Continued)

FOREIGN PATENT DOCUMENTS

| CN | 104320762 | 1/2015 |
| EP | 2 722 832 A1 | 4/2014 |

OTHER PUBLICATIONS

European Search Report dated May 30, 2016 (with Written Opinion) in European Application 15200157.4 filed on Dec. 15, 2015.

*Primary Examiner* — Dai A Phuong
(74) *Attorney, Agent, or Firm* — Oblon, McClelland, Maier & Neustadt, L.L.P.

(57) ABSTRACT

A method for determining a position for a stationary device with assistance provided by a mobile device is disclosed. The method comprises receiving, by a microphone of the stationary device, an activation sound; in response to the received activation sound, sending a request for position data addressed to the mobile device; receiving position data from the mobile device; and storing the position data as being the position of the stationary device. A method for assisting, by a mobile device, in determining a position for a stationary device is also disclosed. A stationary device and a system for determining a position for the stationary device are also disclosed.

13 Claims, 5 Drawing Sheets

(56) References Cited

U.S. PATENT DOCUMENTS

| | | | |
|---|---|---|---|
| 2012/0094696 A1* | 4/2012 | Ahn | H04W 4/028 |
| | | | 455/456.2 |
| 2014/0104038 A1 | 4/2014 | Hokazono et al. | |
| 2014/0323048 A1* | 10/2014 | Kang | H04W 4/008 |
| | | | 455/41.2 |
| 2014/0324431 A1* | 10/2014 | Teasley | G10L 15/22 |
| | | | 704/246 |
| 2015/0016642 A1 | 1/2015 | Walsh et al. | |
| 2015/0026580 A1* | 1/2015 | Kang | G06F 3/167 |
| | | | 715/728 |
| 2015/0067163 A1* | 3/2015 | Bahnsen | H04W 4/02 |
| | | | 709/225 |
| 2015/0095155 A1* | 4/2015 | Holmquist | H04L 67/18 |
| | | | 705/14.58 |
| 2015/0119008 A1* | 4/2015 | Kim | H04W 4/02 |
| | | | 455/414.2 |
| 2015/0168538 A1 | 6/2015 | Bradley et al. | |
| 2016/0057597 A1* | 2/2016 | Hines | H04W 4/02 |
| | | | 455/404.2 |
| 2016/0204837 A1* | 7/2016 | Sol | H04B 5/06 |
| | | | 455/41.1 |
| 2016/0295376 A1* | 10/2016 | Geng | H04W 4/008 |
| 2017/0280109 A1* | 9/2017 | Scalisi | H04N 5/2257 |
| 2018/0077094 A1* | 3/2018 | Gershman | H04W 4/14 |

\* cited by examiner

METHOD, STATIONARY DEVICE, AND SYSTEM FOR DETERMINING A POSITION

TECHNICAL FIELD

The present invention relates to methods for determination of a position for a device. The invention also relates to a device and a system arranged to determine a position at which the device is located.

BACKGROUND OF THE INVENTION

Systems comprising a plurality of interconnected stationary devices are common in many different technique areas. The devices may be different types of computers, loudspeakers, cameras, lamps, sensors, etc. The systems may be found in different environments such as in office spaces, home environments, and industrial premises. When controlling such a system, for example when configuring or troubleshooting the devices included therein, it may be beneficial to know the position of the devices.

One solution to this problem is to arrange a positioning unit in each of the stationary devices such that the device may determine its position. The position may be determined by use of for example GPS information, access point information or WiFi network information. A drawback with this solution is that the production of the stationary device may become more costly and complex.

Patent application CN104320762 discloses an alternative solution in which a mobile device sends its own position information to a web camera which sends the position information as being its own location to a server. A drawback with this solution is that the position determination may become complex and time-consuming since the mobile device, and possible the user thereof, must know which web camera to send the position information to.

There is thus a need for a simple method for determining a position of a stationary device which contributes to a cost-efficient and simple construction of the device and which is time-efficient from a user perspective.

SUMMARY OF THE INVENTION

It is an object of the present invention to provide a method for determining a position for a stationary device. It is also an object to provide a method for assisting in determining the position. It is also an object to provide a stationary device and a system being arranged to determine a position at which the device is located.

According to a first aspect, a method for determining a position for a stationary device with assistance provided by a mobile device is provided. The method comprises: receiving, by a microphone of the stationary device, an activation sound; in response to the received activation sound, sending a request for position data addressed to the mobile device; receiving position data from the mobile device; and storing the position data as being the position of the stationary device.

One purpose of the inventive method is to provide a simple method for determining a position of a device without the need for a positioning unit in the device. Instead, the position of a mobile device is used as the position of the stationary device. Another purpose of the inventive method is to also simplify the method from a user perspective. By the inventive method where the stationary device requests the position data from the mobile device, neither the mobile device nor the user thereof need to select or know to which stationary device to send position data. The mobile device needs simply to respond to the request of position data.

The inventive method may be part of an installation process in which one or more stationary devices are located at different positions and where it is desired to determine the position of each stationary device.

An advantage provided by that the locations of the one or more stationary devices are determined is that a more simple and clear overview of the stationary devices may be provided to a user. This advantage may in turn alleviate a selection (in software) of a stationary device during for example configuration of the device. It is not necessary to know any name or ID of the stationary device in order to make the selection. Instead, the stationary device may be selected based on its location. For example, the user may be provided with a digital map in which the one or more stationary device is illustrated by which the selection may be made.

Another advantage provided by the present invention is that the stationary device does not need to be equipped with a positioning unit, which may reduce the cost and complexity in the production of the stationary device.

The method is particularly advantageous when the stationary device is connected to a wired network since the device then typically has no means for determining its position. A stationary device connectable to a wireless network, such as a WiFi network, may have the possibility to determining its position by measuring signal intensities from e.g. wireless access points. This type of positioning may however have low precision in comparison to GPS positioning.

An advantage provided by that the locations of the stationary devices are known is that stationary devices and other units which are part of a system may know each other's position. The units may thus know how they are positioned relative each other. This information may be used for configuring the stationary devices.

In one embodiment, the activation sound is provided by the mobile device. This feature is advantageous in that the position data and activation sound is provided by a single device which is practical from a user perspective.

In one embodiment, the method comprises activating a position determination mode of the stationary device. The position determination mode may be activated before receiving the activation sound. An advantage with the position determination mode is that the stationary device may actively receive and/or analyze sound during a relatively short process of positioning determination. For a device which does not utilize its microphone all the time, it may be power-efficient to activate the microphone only when it is needed. The method may further comprise a concluding operation of deactivating the position determination mode when the position determination process has ended.

In one embodiment, the method comprises handshaking between the stationary device and the mobile device. The handshaking may be performed before receiving the activation sound by the microphone of the stationary device. The handshaking may comprise data exchange between the stationary device and the mobile device for setting up communication parameters. The handshaking may comprise the above disclosed activation of a position determination mode.

In one embodiment, the method further comprises: receiving, by the microphone, a further activation sound; comparing the volume levels of the received activation sounds; and if the further volume level is higher than the previously determined volume level: in response to the received further activation sound, sending a further request for position data addressed to the mobile device; and receiving further position data from the mobile device; wherein the position data that has been requested and received in response to the determined activation sound that has the highest volume level is stored as being the position of the stationary device.

In this embodiment, the stationary device again requests a position of the mobile device and assumes the received position as its own, if the stationary device receives an activation sound having a higher volume level than a previously received activation sound. This method is advantageous when the method is performed for a system with a plurality of stationary devices which are located such that the stationary device may hear activation sounds intended for other stationary devices of the system.

In one embodiment, the position data is received by the stationary device. The received position data may be stored in a memory comprised in the stationary device, in a memory of the mobile device, or in a memory of an external server to which access is provided by a cloud service.

In one embodiment, the mobile device is located nearby the stationary device before an activation sound is provided. The term nearby should be interpreted in relation to the prevailing conditions. By nearby is meant on a maximum distance from the stationary device such that an acceptable position estimation is provided. The meaning of acceptable position estimation may vary between different situations. Examples of different situations are disclosed below in the detailed description.

In one embodiment, the position for each in a plurality of stationary devices is determined by the above disclosed method, and the position data is stored in a common memory for the stationary devices. By use of a common memory, the stationary devices or a controller may know each other's positions which may be beneficial when configuring the system. The method may further comprise providing, based on the stored position data, a digital map arranged to visualize the positions of the plurality of stationary devices. This may be a more advantageous presentation of the positions, instead of text representation, in that the visual format is easier to overview. By the digital map, the stationary devices may be identified by their position instead of by their names. Thus, a user does not need to know which device has which name.

According to a second aspect, a method for assisting, by a mobile device, in determining a position for a stationary device is provided. The method comprises: playing, by a loudspeaker of the mobile device, an activation sound; receiving, by a receiver of the mobile device, a request for position data from the stationary device; determining, by a positioning unit of the mobile device, a position of the mobile device; sending, by a transmitter of the mobile device, position data corresponding to the determined position to the stationary device.

The method may be implemented as for example an application on the mobile device or as a web service.

According to a third aspect, a non-transitory computer-readable recording medium is provided. The medium has recorded thereon a program for implementing the method according to the above second aspect when executed on a mobile device having processing capabilities.

According to a fourth aspect, a stationary device arranged to determine a position at which the stationary device is located is provided. The stationary device comprises: a microphone arranged to receive an activation sound; a transmitter arranged to, in response to the received activation sound, send a request for position data to the mobile device; a receiver arranged to receive position data from the mobile device; and a memory arranged to store the received position data as being the position of the device.

The stationary device may be a camera, a loudspeaker, a door station, a microphone device, or an encoder.

The stationary device may be connected to a wired network.

According to a fifth aspect, a system comprising a stationary device and a mobile device is provided. The stationary device comprises: a microphone arranged to receive an activation sound; a transmitter arranged to, in response to the received activation sound, send a request for position data to the mobile device; a receiver arranged to receive position data from the mobile device; and a memory arranged to store the received position data as being the position of the device. The mobile device comprises: a loudspeaker arranged to provide an activation sound; a receiver arranged to receive the request for position data from the stationary device; a positioning unit arranged to determine a position of the mobile device; and a transmitter arranged to, in response to the request for position data send position data corresponding to the determined position to the stationary device.

Above disclosed features and advantages apply to the system as well. To avoid undue repetition, reference is made to the above disclosure.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The operations of any method disclosed herein do not have to be performed in the exact order disclosed, unless explicitly stated.

BRIEF DESCRIPTION OF DRAWINGS

The above disclosed and other aspects of the present invention will now be described in more detail, with reference to the appended drawings showing embodiments of the invention.

Note that figures are not to scale for purposes of clarity.

DETAILED DESCRIPTION

The present invention will now be described more fully with reference to the accompanying drawings, in which currently preferred embodiments of the invention are shown. The invention may however be embodied in many different forms and should not be construed as limited to the embodiments set forth herein.

Figure 1:
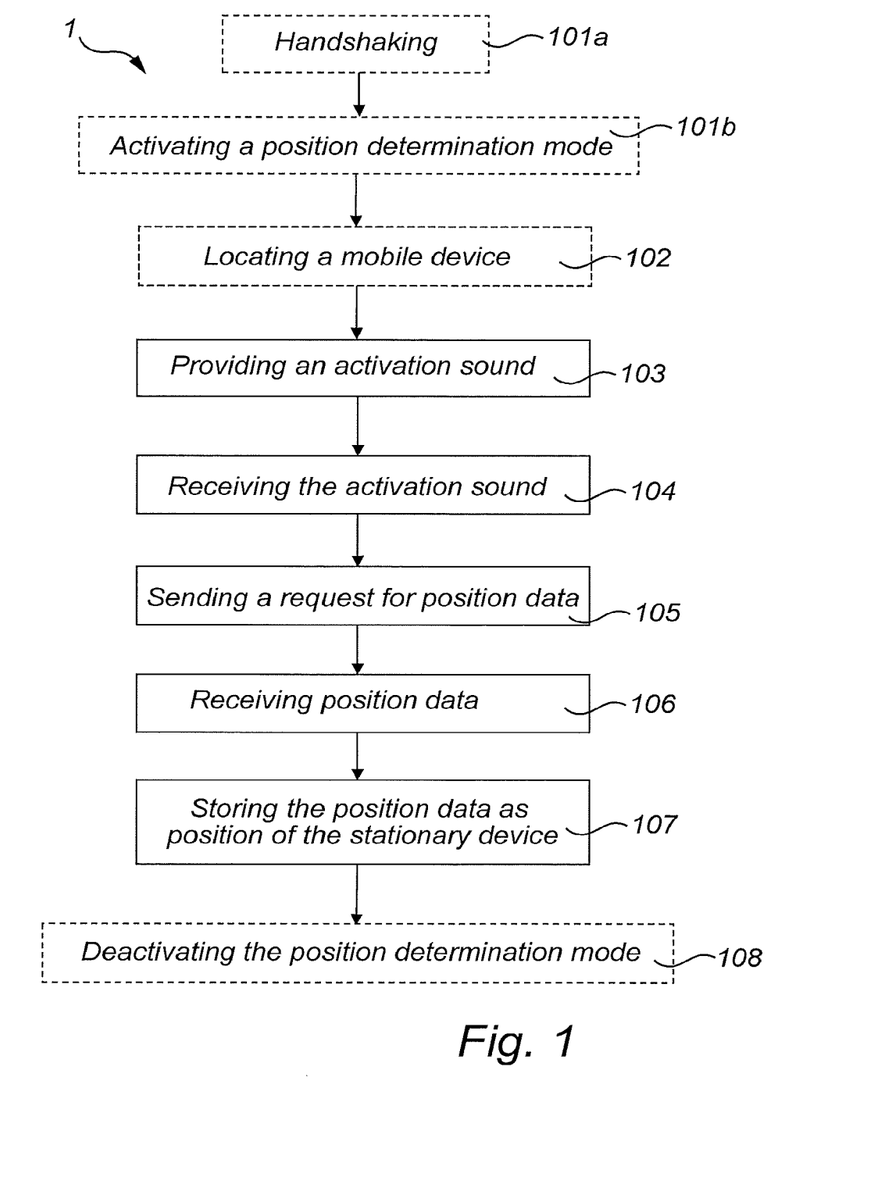
FIGS. 1 and 2 illustrate methods for determining a position for a stationary device according to embodiments of the invention.

A method 1 for determining a position for a stationary device according to an embodiment of the invention is illustrated in FIG. 1. The method 1 is performed with assistance provided by a mobile device. The mobile device may be any device which is portable and which is able to determine its position. Non-limiting examples of types of mobile devices are a mobile phone, a remote controller, a portable computer (for example a tablet computer), and a mobile tool for supporting an installation process.

The stationary device may be any device which comprises a microphone. Non-limiting examples of stationary devices are a loudspeaker, a camera such as a surveillance camera, a door station (a device provided at an entrance for e.g. identification or gatekeeping), a door bell, an encoder (a converter converting a camera's analogue output signal to a digital output signal), and a remote switch. The stationary device is typically a device which is installed at a permanent location in for example a home or in an office building.

The method 1 comprises providing 103 an activation sound. The activation sound may be provided by the mobile device.

The activation sound may be any sound which the stationary device can receive by its microphone. Non-limiting examples of activation sounds are a predetermined tune or a monotonous sound having for example a specific length or frequency.

The method 1 further comprises receiving 104 the activation sound by the microphone of the stationary device.

The method 1 further comprises sending 105 a request for position data addressed to the mobile device. The request may be sent from the stationary device. The request may alternatively be sent by a controller which is connected to the stationary device (but not part of it) and to the mobile device. The request is however initiated by the by the stationary device, regardless of which unit that sends the request. In other words, the stationary device may send the request addressed to the mobile device or instruct e.g. a controller to send the request.

The address of the mobile device is known to the sender of the request, i.e. to the stationary device or to the controller. The request may comprise the address to which the response is to be sent for enabling the mobile device to respond without using broadcast.

The method 1 further comprises receiving 106 position data from the mobile device. The position data corresponds to the position at which the mobile device is currently located. The unit which is the sender of the request may also be the receiver of the position data. For example, the stationary device may both send the request for position data to and receive the position data from the mobile device.

The method 1 further comprises storing 107 the received position data as being the position data of the stationary device. The position data may be stored in a local memory such as a memory comprised in the stationary device or in an external memory which may be common for a system of a plurality of stationary devices. The position data may alternatively, or additionally, be stored in a global memory. The global memory may be provided on a server to which access is provided by a cloud service.

The method operations of sending 105 a request for position data, receiving 106 position data and storing 107 the position data may thus be performed partly or in full by the stationary device or by a separate controller which is connected to the stationary device. The controller may be a common controller for a plurality of stationary devices.

The inventive method may be part of an installation process in which one or more stationary devices are located at different positions and where it is desired to determine the position of each stationary device.

An advantage provided by that the locations of the one or more stationary devices are determined is that a more simple and clear overview of the stationary devices may be provided to a user. This may in turn alleviate a selection (in software) of a stationary device during for example configuration of the device. It is not necessary to know any name or ID of the stationary device in order to make the selection. Instead, the stationary device may be selected based on its location. For example, the user may be provided with a digital map in which the one or more stationary device is illustrated by which the selection may be made.

Another advantage provided by the present invention is that the stationary device does not need to be equipped with a positioning unit, which may reduce the cost and complexity in the production of the stationary device.

An advantage provided by that the locations of the stationary devices are known is that stationary devices and other units which are part of a system may know each other's position. The units may thus know how they are positioned relative each other. This information may be used for configuring the stationary devices.

If, for example, the stationary devices are loudspeakers, the position information may be used for configuring a sound image in an audio zone provided by a plurality of loudspeakers.

If, for example, the stationary devices are surveillance cameras, the position information may be used for maximizing the total field of view for a plurality of surveillance cameras by minimizing the overlap of fields of view of the cameras.

In order to optimize the correspondence between the position of the mobile device and the position of the stationary device, the method 1 may comprise locating 102 the mobile device nearby the stationary device before providing 103 the activation sound. The term nearby should be interpreted in relation to the prevailing conditions. By nearby is meant on a maximum distance from the stationary device such that an acceptable position estimation is provided. The meaning of acceptable position estimation may vary between different situations.

For example, if a plurality of stationary devices is located in a ware house with at least some ten meters between each other, it may be sufficient to estimate the position of the stationary devices with a margin of error of one or two meters. An acceptable location of the mobile device nearby may in that case be a location maximum about a meter from the stationary device.

As another example, if a plurality of stationary devices is located in a normal-sized office space only a few meters apart, an acceptable location of the mobile device nearby may be a location maximum a decimeter from the stationary device.

In other words, the term a location nearby may be defined as a location maximum on a distance from the stationary device in order not to determine a position for the stationary device such that the determined position may be mistaken as the position of another stationary device. The margin of error of the position determination of the mobile device may also be taken into account when interpreting the term nearby.

The mobile device is, of course, preferably located as close to the corresponding stationary device as possible in order to optimize the correspondence between the positions of the mobile device and the corresponding stationary device.

In one embodiment, the method 1 may comprise an initial operation of handshaking 101*a*. The handshaking 101*a* may comprise data exchange between the stationary device and the mobile device for setting up communication parameters.

In one embodiment, the method 1 may comprise an initial operation of activating 101*b* a position determination mode of the stationary device. The position determination mode may comprise, for example, activating the microphone of the stationary device and/or activating a sound evaluation process which evaluates any received sound to distinguish the activation sound. The sound evaluation process may comprise performing a frequency analysis of received sound and comparing the result with the result of a corresponding frequency analysis of the activation sound.

The activation 101b of the position determination mode may be performed by that the stationary device receives an activation data signal. The activation data signal may be sent by the mobile device. The activation 101b may in one embodiment be part of the handshaking 101a. In other words, the handshaking 101a may comprise activating 101b the position determination mode.

In one embodiment, the activation 101b may be performed by an NFC connection to the stationary device. In this embodiment, the stationary device comprises an NFC reader and the mobile device comprises an NFC tag. The mobile device is located nearby the stationary device, whereby the NFC tag is read by the NFC reader of the stationary device which activates the position determination mode.

Alternatively or in combination, the activation 101b may be performed by broadcasting a position determination mode activation signal on a network onto which the stationary devices are connected to.

Alternatively or in combination, the position determination mode activation signal may be sent as dedicated messages to the stationary devices. This requires knowledge of addresses to the different stationary devices. Such addresses may be stored in a memory of the network. Preferably, the dedicated messages are sent at the same time.

Alternatively or in combination, a stationary device may be set to be in position determination mode when entering a set-up mode of the stationary device. The set-up mode may e.g. be entered upon first activation of the stationary device.

The method 1 may further comprise a concluding operation of deactivating 108 the position determination mode.

It is appreciated that the method 1 may comprise every operation that is illustrated in FIG. 1, or a selection thereof.

Figure 2:
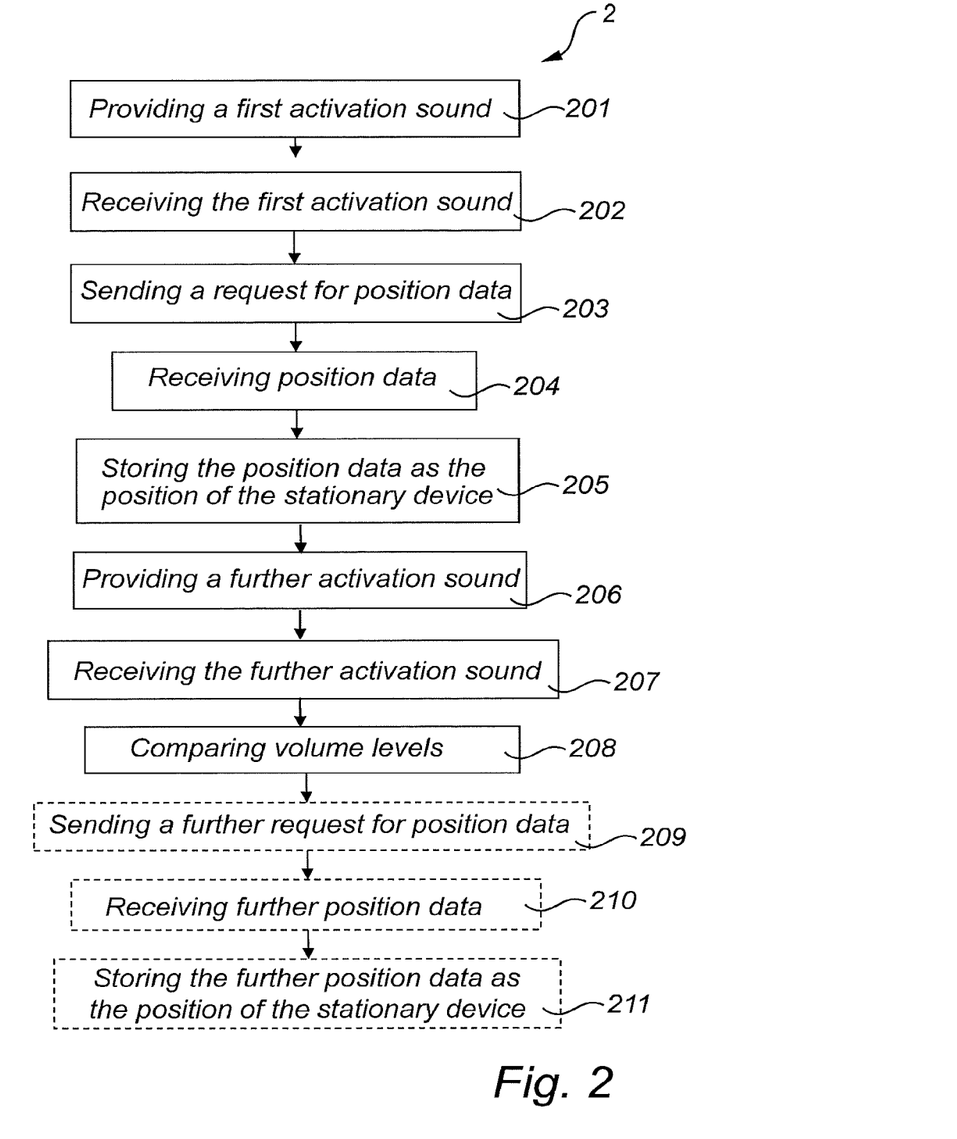

Another embodiment of a method 2 for determining a position of a stationary device is illustrated in FIG. 2. The method 2 is performed by a stationary device and a mobile device as for the method 1 disclosed above.

The method 2 comprises operations of providing 201 a first activation sound, receiving 202 the first activation sound, sending 203 a request for position data, receiving 204 position data, and storing 205 the received position data as the position of the device. Corresponding operations have been disclosed in connection to FIG. 1. In order to avoid undue repetition, reference is made to the above.

The method 2 further comprises providing 206 a further activation sound. The further activation sound may be provided in the same manner as the previously provided 201 first activation sound. For example, both activation sounds may be provided by the mobile device.

The method 2 further comprises receiving 207, by the stationary device, the further activation sound. The further activation sound is received 207 in the same manner as the receipt 202 of the first activation sound.

The method 2 further comprises comparing the volume levels of the received activation sounds, i.e. the first activation sound and the further activation sound. The volume levels may be compared by a controller of the stationary device or by an external controller to which the stationary device is connected. The volume levels may be compared by firstly determining the volume levels and secondly comparing the determined volume levels with each other.

If the comparison results in that the further activation sound has a higher volume level than the first activation sound, the method 2 further comprises sending 209 a further request for position data to the mobile device, receiving 210 further position data from the mobile device, and storing 211 the further position data as the position of the stationary device.

In other words, if the stationary device receives an activation sound having a higher volume level than a previously received activation sound, the stationary device requests the position of the mobile device and assumes this position as its own. Any previously stored position data may be deleted, overwritten, or kept as historical data.

The method 2 is based on that an activation sound with a higher volume level is assumed to indicate that the mobile device is located nearer the stationary device. The determined position of the stationary device (by assuming the position of the mobile device) will thus correspond better to the actual position of the stationary device.

An exemplary scenario of when the method 2 may be advantageous is when a technician installs and configures a system with a plurality of stationary devices, such as loudspeakers or cameras, wherein the position of each device is determined by the inventive method. For each device, an activation sound may be provided. If a first stationary device is located near a second stationary device such that the first stationary device receives the activation sound intended for the second stationary device, the first stationary device requests and receives position data not intended for it. By the method 2, this problem is counteracted in a simple manner by that each stationary device stores the position corresponding to the received activation sound with the highest volume level.

Figure 3:
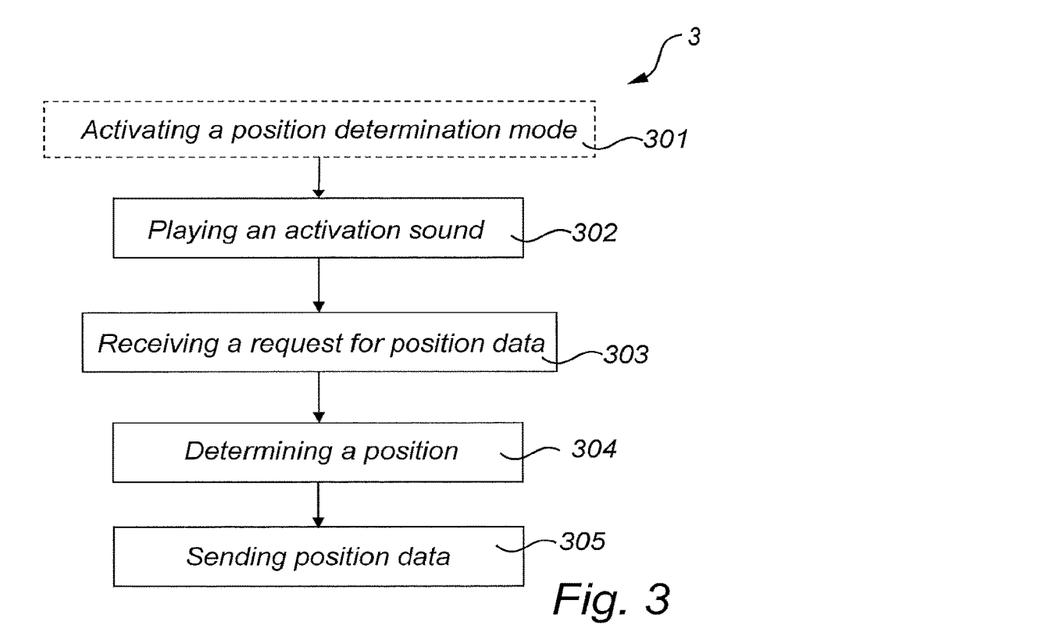
FIG. 3 illustrates a method for assisting in determining a position for a stationary device according to an embodiment of the invention.

An embodiment of a method 3 for assisting in determining a position for a stationary device is illustrated in FIG. 3. The method 3 may be performed by a mobile device such as the mobile device in above disclosed embodiments.

The method comprises playing 302 an activation sound. Non-limiting examples of activation sounds are a predetermined tune or a monotonous sound having for example a specific length or frequency. The activation sound is chosen such that it can be received by a microphone of the stationary device.

The method further comprises receiving 303 a request for position data. As disclosed above, the request may be received from the stationary device or from another unit such as a controller.

The method further comprises determining 304 a position of the mobile device. The position is determined by a positioning unit comprised in the mobile device. The position may be determined in a conventional manner such as by use of GPS information, access point information or WiFi network information. The positioning unit may thus comprise different components depending on the positioning technique to be used. The construction of the positioning unit and the positioning determination are commonly known knowledge.

The method further comprises sending 305 position data corresponding to the determined position. The position data may be sent to the unit from which the request was received. The position data may be sent to the stationary device or to another unit such as a controller. The position data is sent by a transmitter of the mobile device.

The method 3 may optionally comprise activating 301 a position determination mode of the stationary device. The activation 301 may be performed by sending an activation signal to the stationary device whose position is to be determined. The activation signal may be part of a handshaking procedure. The activation may comprise sending data with information pertaining to the process of determining the position. Non-limiting examples of such information are time to be activated and definition of the activation signal that is going to be provided. The activation signal may be sent as a broadcast message which may be received by a plurality of stationary devices. In other words, the mobile device may activate multiple stationary devices which are to be position determined by a single activation signal.

Non-limiting examples of types of mobile devices are a mobile phone, a remote controller, a portable computer (for example a tablet computer), and a mobile tool for supporting an installation process. As mentioned above, the mobile device may be any device which is portable and which is able to determine its position.

Figure 4:
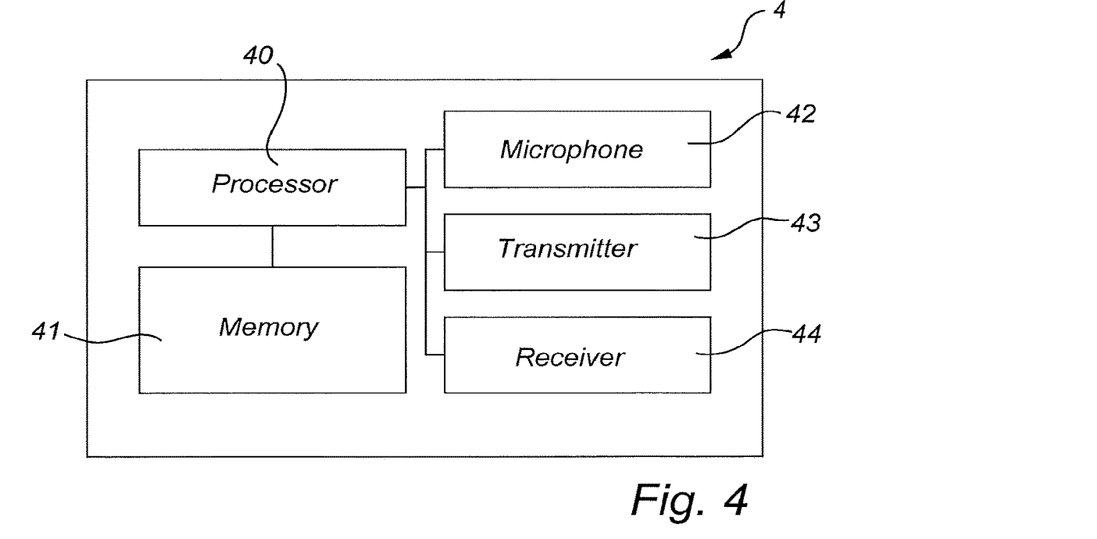
FIG. 4 illustrates a device arranged to determine a position at which the device is located.

FIG. 4 illustrates a stationary device 4. The device 4 is arranged to determine at which position it is located.

The stationary device 4 comprises a processor 40 being connected to a memory 41, a microphone 42, a transmitter 43, and a receiver 44. The microphone 42 is arranged to receive an activation sound. The transmitter 43 is arranged to, in response to the received activation sound, send a request for position data to a mobile device. The receiver 44 is arranged to receive position data from the mobile device. The memory 41 is arranged to store the received position data as being the position of the mobile device. Examples of these functions have been disclosed above in connection to previous embodiments.

It is noted that a device according to other embodiments may be connected to an external memory on which the received position data is stored as being the position of the device. The external memory may be comprised in another device, a controller, or at a global server to which access is provided by a cloud service.

It is also noted that a device according to other embodiments may be connected to an external controller which sends the request for position data to and receives the position data from the mobile device.

Figure 5:
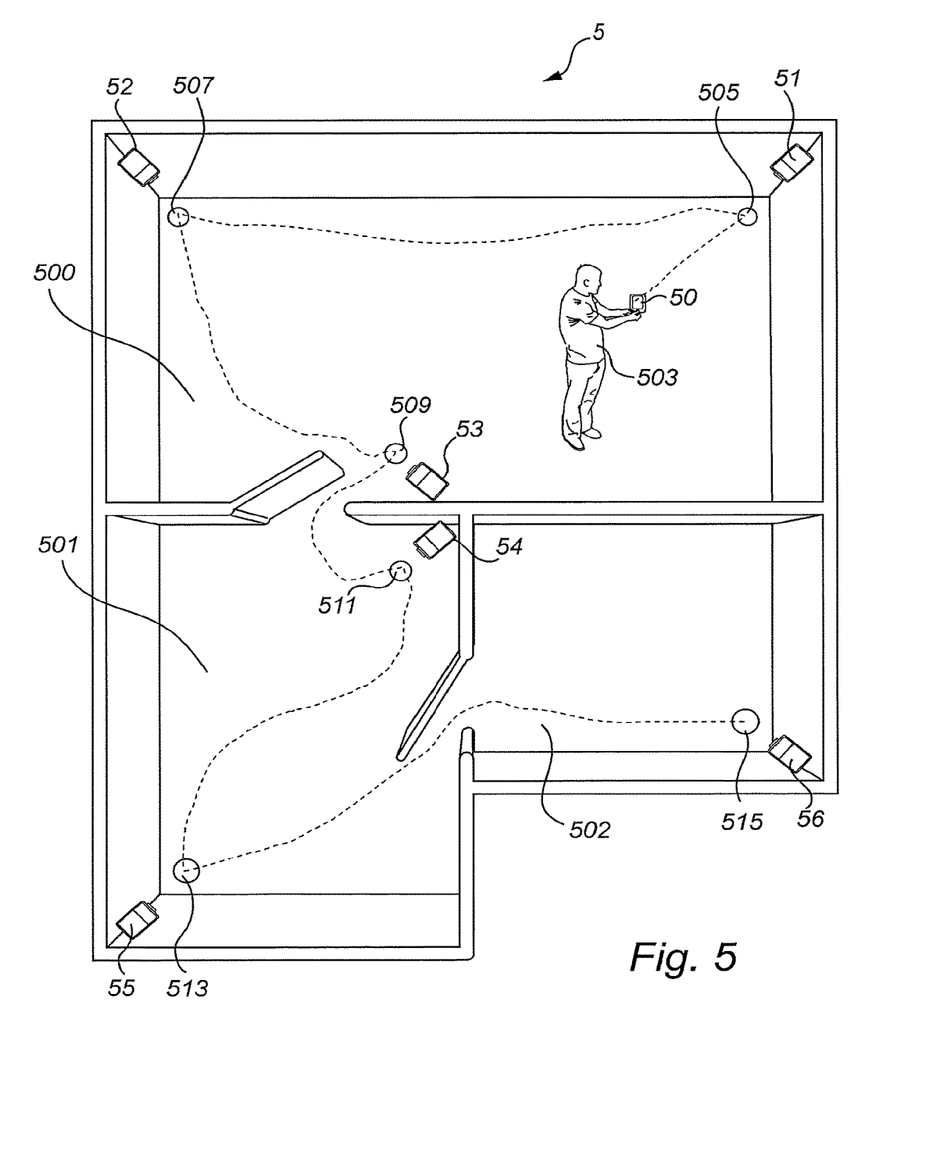
FIG. 5 illustrates premises in which devices which are to be position determined are located.

An example of a scenario where a position of each in a plurality of stationary devices is determined will now be disclosed with reference to FIG. 5. FIG. 5 is a view from above of a first room 500, a second room 501, and a third room 502. The first room 500 houses a first stationary device 51, a second stationary device 52, and a third stationary device 53. The second room 501 houses a fourth stationary device 54 and a fifth stationary device 55. The third room 502 houses a sixth stationary device 56.

The disclosed scenario may be part of an installation process for the plurality of stationary devices. A user 503 is equipped with a mobile device 50. Non-limiting examples of possible mobile device types have been disclosed above. The plurality of stationary devices and the mobile device may together form a system. The stationary devices are in this scenario formed by a plurality of cameras.

The stationary devices 51, 52, 53, 54, 55, 56 have each been mounted at their respective stationary positions. The stationary devices 51, 52, 53, 54, 55, 56 are connected to the mobile device 50. The connection could for example comprise a wireless connection such as a WiFi connection, or a wired connection. The connection could be a combination thereof. For example, each stationary device may be connected to a wired network which in turn is connected, by e.g. a router, wirelessly to the mobile device 50. The connection may be global, such as through an Internet connection, or local such as a Bluetooth connection.

Each stationary device 51, 52, 53, 54, 55, 56 has access to an address to the mobile device 50 such that the stationary device may send data to the mobile device 50 through the connection therebetween. The address may be provided to the stationary device by for example being sent by the mobile device through the connection. The mobile device 50 may for example send a broadcast message comprising its address on the network. The broadcast message is received by the stationary devices which are coupled to the same network. Alternatively, the stationary devices 51, 52, 53, 54, 55, 56 may be pre-configured with the address to the mobile device.

The position determining process may begin by an activation of a position determination mode for a subset or all of the plurality of stationary devices 51, 52, 53, 54, 55, 56. The position determination mode may be activated by that the mobile device 50 sends an activation signal to the stationary devices to be activated. The user 503 may initiate the sending of the activation signal by the mobile device 50. The activation signal may be sent through the above mentioned connection, or through another connection, see above.

Alternatively, the stationary devices 51, 52, 53, 54, 55, 56 may be arranged to be set in position determination mode by a user input. For example, a stationary device may be provided with an activation button or the like.

When at least the first stationary device 51 is in an active mode for receiving an activation sound, the user 503 goes with the mobile device 50 to a first position 505. At the first position 505, the user 503 initiates playing of an activation sound by the mobile device 50. The activation sound is received by at least the first stationary device 51, which sends a request for position data addressed to the mobile device 50. The mobile device 50 determines its position by a positioning unit, and responds to the request by sending position data corresponding to the determined position to the first stationary device 51. The first stationary device 51 receives the position data and stores the position data as being its own position.

The user 503 moves to a second position 507 where the above disclosed process is repeated, i.e. playing an activation sound; requesting, determining and sending/receiving position data; and storing the position data received by the second stationary device 52 as being the position of that stationary device. The process is repeated for the third stationary device 53 at a third position 509, for the fourth and fifth stationary devices 54, 55 of the second room 501 at a fifth position 511 and a sixth position 513, and finally for the sixth stationary device 56 of the third room 502 at a sixth position 515. The position of each of the stationary devices 51, 52, 53, 54, 55, 56 has thereby been determined.

Figure 6:
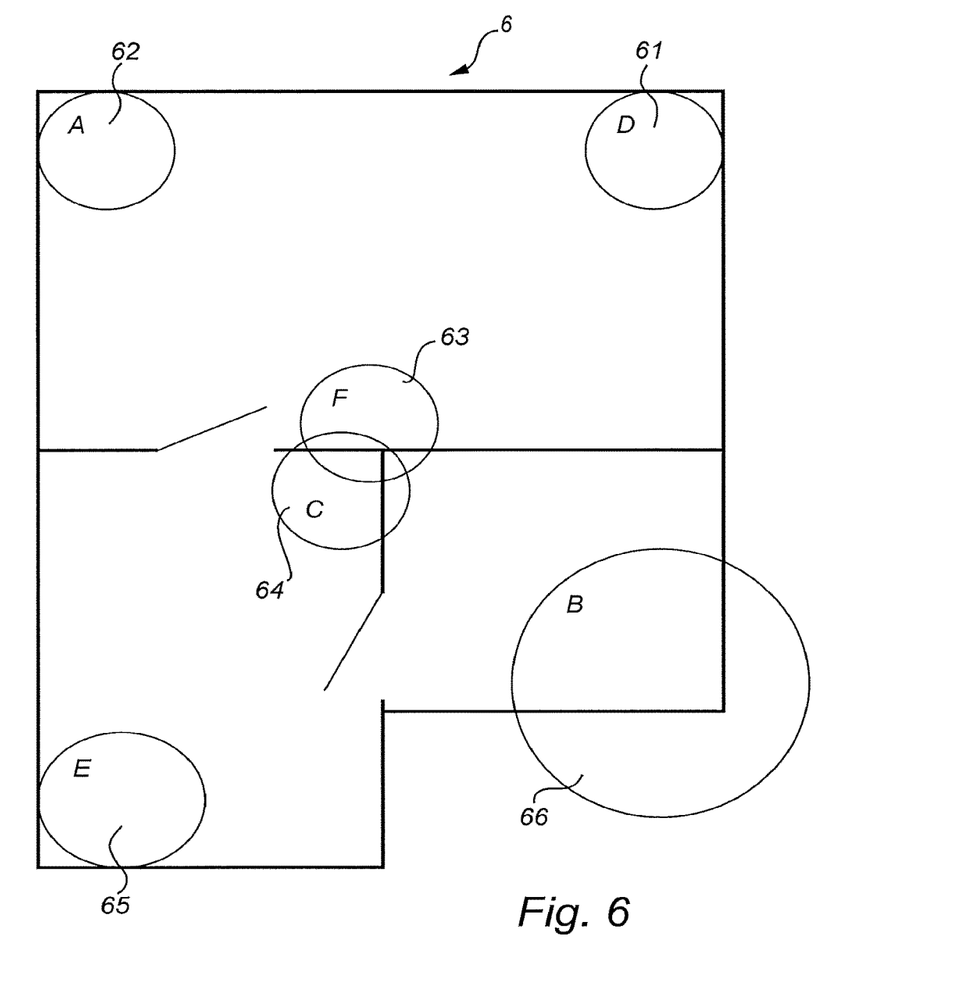
FIG. 6 illustrates a digital map of the premises in FIG. 5.

Based on the determined positions, a digital map 6 may be provided as illustrated in FIG. 6. One purpose of the digital map 6 is to visualize the positions of the plurality of stationary devices 51, 52, 53, 54, 55, 56. This may be a more advantageous presentation of the positions, instead of text representation, in that the visual format is easier to overview. By the digital map 6, the stationary devices 51, 52, 53, 54, 55, 56 may be identified by their position instead of by their names. Thus, a user does not need to know which device has which name. A specific stationary device may be selected, for example in order to configure a device parameter or troubleshoot the device, based on its position in the digital map 6 instead of by inputting or selecting the name of the device.

The stationary devices 51, 52, 53, 54, 55, 56 are represented in the digital map 6 by respective circles 61, 62, 63, 64, 65, 66. The name of each stationary device may be provided in the circle, for example "D" for the first stationary device 51 in the first circle 61. The size of the circles differs from each other depending on the precision of the corresponding position determination. The circled area for each stationary device represents the area in which the stationary device is located. The circles may overlap as can be seen by the circles denoted 63 and 64. Conclusions regarding the real position may be drawn by use of static components of the map such as walls and doors. For example, even if the circle denoted 66 is relatively large and thus the corresponding stationary device may be located within a relatively large area, the area of the circle 66 located outside the room may be disregarded.

Returning to FIG. 5, it may be noted that it is not necessary for the user to go to each stationary device and play an activation sound. In a simpler version of the position determination method, the user 503 may go to a position of each room, e.g. a central position, at which the activation sound is provided. The first, second, and third stationary devices 51, 52, 53 will in that case take the central position of the first room 500 as their respective position, and vice versa for the fourth, fifth stationary devices 54, 55 of the second room 501 and the sixth stationary device 56 of the third room 502. This simplified method may be used if for example it is sufficient to determine in which room each stationary device is located.

It should be noted that the illustrated positions 505, 507, 511, 513, 515 and paths therebetween are provided only as examples and the invention should not be construed as limited by these illustrations.

The person skilled in the art realizes that the present invention by no means is limited to the preferred embodiments described above. On the contrary, many modifications and variations are possible within the scope of the appended claims. For example, the inventive methods are not limited to that the methods operation must be performed in any of the above exemplified orders. The skilled person realizes how the methods may be altered depending on the configuration of the one or more units performing the method.

The invention claimed is:

1. A method for determining a position of a stationary device with assistance provided by a mobile device, the method comprising:
   locating the mobile device nearby the stationary device;
   providing, by a speaker of the mobile device after the mobile device is located nearby the stationary device, an activation sound;
   receiving, by a microphone of the stationary device, the activation sound;
   requesting, by the stationary device in response to the received activation sound, position data from the mobile device;
   receiving, by the stationary device, the position data from the mobile device in response to requesting the position data, the position data indicating a position of the mobile device, and the position data being transmitted by a transmitter of the mobile device to the stationary device; and
   storing, by the stationary device, the position data as being the position of the stationary device.

2. The method according to claim 1, further comprising: activating a position determination mode of the stationary device before receiving the activation sound.

3. The method according to claim 1, further comprising: handshaking between the stationary device and the mobile device before receiving the activation sound.

4. The method according to claim 1, further comprising:
   receiving, by the microphone, a further activation sound;
   comparing, by the stationary device, a volume level of the activation sound with a volume level of the further activation sound; and
   if the volume level of the further activation sound is higher than the volume level of the activation sound:
      sending, by the stationary device to the mobile device in response to the further activation sound, a further request for position data addressed;
      receiving, by the stationary device, further position data from the mobile device; and
      replacing, by the stationary device, the position data with the further position data and storing the further position data.

5. The method according to claim 1, wherein the position data is stored in a memory of the stationary device, in a memory of the mobile device, or in a memory of an external server to which access is provided by a cloud service.

6. The method according to claim 1, wherein the position for each in a plurality of stationary devices is determined by the method, and wherein the position data is stored in a common memory for the stationary devices.

7. The method according to claim 6, further comprising:
   providing, based on the stored position data, a digital map arranged to visualize the positions of the plurality of stationary devices.

8. A method for assisting, by a mobile device, in determining a position for a stationary device, the method comprising:
   locating the mobile device nearby the stationary device;
   outputting, by the mobile device after the mobile device is located nearby the stationary device, an activation sound;
   receiving, by the mobile device, a request for position data from the stationary device in response to a microphone of the stationary device receiving the activation sound;
   determining, by the mobile device in response to the request for position data, a position of the mobile device;
   transmitting, by a transmitter of the mobile device, position data to the stationary device, the position data indicating the position of the mobile device.

9. A non-transitory computer-readable recording medium having recorded thereon a program for implementing the method according to claim 8 when executed on a mobile device having processing capabilities.

10. A stationary device, comprising:
    a microphone that receives an activation sound provided by a speaker of a mobile device that is located nearby the stationary device;
    a transmitter that transmits, in response to the received activation sound, a request for position data to the mobile device;
    a receiver that receives position data from the mobile device in response to the request for position data, the position data indicating a position of the mobile device and the mobile device transmitting the position data for reception by the stationary device; and
    a memory that stores the position data as being the position of the stationary device.

11. The stationary device according to claim 10, wherein the stationary device is connected to a wired network.

12. The stationary device according to claim 10, wherein the stationary device is a camera, a loudspeaker, a door station, a microphone device, or an encoder.

13. A system, comprising:
   a mobile device; and
   a stationary device comprising:
      a microphone that receives an activation sound provided by a speaker of the mobile device that is located nearby the stationary device;
      a transmitter that transmits, in response to the received activation sound, a request for position data to the mobile device;
      a receiver that receives position data from the mobile device in response to the request for position data, the position data indicating a position of the mobile device and the mobile device transmitting the position data for reception by the stationary device; and
      a memory that stores the position data as being the position of the stationary device, wherein
   the mobile device:
      outputs the activation sound;
      receives the request for position data from the stationary device;
      determines the position of the mobile device; and
      transmits the position data to the stationary device in response to the request for position data.

* * * * *